(12) United States Patent
Inaba

(10) Patent No.: US 11,691,288 B2
(45) Date of Patent: Jul. 4, 2023

(54) ROBOT CONTROL SYSTEM

(71) Applicant: FANUC CORPORATION, Yamanashi (JP)

(72) Inventor: Ryoutarou Inaba, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 301 days.

(21) Appl. No.: 16/825,253

(22) Filed: Mar. 20, 2020

(65) Prior Publication Data

US 2020/0306972 A1 Oct. 1, 2020

(30) Foreign Application Priority Data

Mar. 25, 2019 (JP) .................................. 2019-056919

(51) Int. Cl.
*B25J 9/16* (2006.01)
*B25J 13/02* (2006.01)
(Continued)

(52) U.S. Cl.
CPC ............ *B25J 9/1674* (2013.01); *B25J 9/163* (2013.01); *B25J 13/006* (2013.01); *B25J 13/06* (2013.01); *B25J 13/084* (2013.01); *B25J 19/06* (2013.01)

(58) Field of Classification Search
CPC ........ B25J 9/1674; B25J 13/006; B25J 19/06; B25J 9/163; B25J 13/084; B25J 13/06;
(Continued)

(56) References Cited

U.S. PATENT DOCUMENTS 6,697,681 B1* 2/2004 Stoddard .................. B25J 13/06
700/83
2004/0260426 A1* 12/2004 Johannessen ............ B25J 13/06
700/245
(Continued)

FOREIGN PATENT DOCUMENTS

DE 102007024209 A1 11/2008
EP 3431229 A1 1/2019
(Continued)

OTHER PUBLICATIONS

Japanese Notice of Reasons for Refusal dated May 11, 2021, for Japanese Patent Application No. 2019056919.
(Continued)

*Primary Examiner* — Stephen Holwerda
(74) *Attorney, Agent, or Firm* — Karceski IP Law, PLLC

(57) ABSTRACT

A robot control system includes a control device for controlling a robot and a portable operating panel connected to the control device. The portable operating panel and at least one other device include contact points connected in series. The control device includes a reception circuit that can detect the opening of at least one of the contact points. The portable operating panel includes a smart device having a sensor. The contact point included in the portable operating panel is opened and closed in conjunction with a physical movement of a switch member attached to an exterior of the smart device. The sensor can detect a physical quantity that changes in conjunction with the physical movement of the switch member. The portable operating panel transmits, to the control device, a detection signal indicating the physical quantity detected by the sensor or information about the physical quantity.

12 Claims, 4 Drawing Sheets

(51) Int. Cl.
*B25J 19/06* (2006.01)
*B25J 13/00* (2006.01)
*B25J 13/08* (2006.01)
*B25J 13/06* (2006.01)

(58) Field of Classification Search
CPC ........... G05B 2219/37388; G05B 2219/39443; G05B 2219/50198
See application file for complete search history.

(56) References Cited

U.S. PATENT DOCUMENTS

| | | | | |
|---|---|---|---|---|
| 2006/0097860 | A1* | 5/2006 | Halfmann | G05B 9/02 702/182 |
| 2008/0046102 | A1* | 2/2008 | Kalhoff | G05B 19/4183 700/78 |
| 2011/0052366 | A1 | 3/2011 | Bonin et al. | |
| 2014/0244034 | A1* | 8/2014 | Toda | G05B 19/409 700/245 |
| 2016/0114478 | A1* | 4/2016 | Wu | B25J 13/06 901/3 |
| 2016/0124397 | A1* | 5/2016 | Bretschneider | G05B 19/0425 700/79 |
| 2016/0149996 | A1 | 5/2016 | Eckert et al. | |
| 2016/0271793 | A1* | 9/2016 | Inaba | H04W 4/023 |
| 2017/0031329 | A1 | 2/2017 | Inagaki et al. | |
| 2017/0036347 | A1 | 2/2017 | Bonin et al. | |
| 2018/0056520 | A1* | 3/2018 | Ozaki | B25J 13/084 |
| 2018/0113435 | A1* | 4/2018 | Tateoka | B25J 9/1674 |
| 2018/0354127 | A1 | 12/2018 | Ando | |
| 2019/0126489 | A1 | 5/2019 | Wada et al. | |
| 2019/0265657 | A1 | 8/2019 | Inagaki et al. | |
| 2019/0299404 | A1 | 10/2019 | Muneto | |

FOREIGN PATENT DOCUMENTS

| | | |
|---|---|---|
| EP | 3456489 A1 | 3/2019 |
| JP | 2004341690 A | 12/2004 |
| JP | 2016060018 A | 4/2016 |
| JP | 2016097467 A | 5/2016 |
| JP | 2016100026 A | 5/2016 |
| JP | 2017033526 A | 2/2017 |
| JP | 2017202550 A | 11/2017 |
| JP | 2017213645 A | 12/2017 |
| JP | 2018051721 A | 4/2018 |
| JP | 2018072882 A | 5/2018 |
| WO | 2017159562 A1 | 9/2017 |

OTHER PUBLICATIONS

Japanese Search Report by Registered Search Organization dated Apr. 28, 2021, for Japanese Patent Application No. 2019056919.
German Office Action dated Nov. 29, 2022, for German Patent Application No. 102020107110.8.

* cited by examiner

ROBOT CONTROL SYSTEM

CROSS-REFERENCE TO RELATED APPLICATIONS

This United States Non-Provisional patent application is based on Japanese Patent Application No. 2019-056919, filed on Mar. 25, 2019, the entire content of which is incorporated herein by reference.

FIELD OF THE INVENTION

The present disclosure relates to a robot control system.

BACKGROUND OF THE INVENTION

There are some robot systems that each include a plurality of emergency stop switches, such as an emergency stop switch provided on a stationary operating panel in a control device, an emergency stop switch provided on a portable operating panel connected to the control device, and an external emergency stop switch provided on a safety fence or the like. The standards specify that an emergency stop input shall be duplicated, thus requiring two reception circuits. This means that the larger the number of emergency stop inputs, the larger the size of the entire circuit.

In order to reduce the size of the circuit, the plurality of emergency stop switches share a single reception circuit by connecting the contact points of the emergency stop switches in cascade (series), wherein which emergency stop switch has been pressed is identified by generating a confirmation signal the moment a contact point is opened as a result of the emergency stop switch on the stationary operating panel or the portable operating panel being pressed and then by inputting the generated confirmation signal to the control device. In this case, an emergency stop that does not cause a confirmation signal to be input to the control device can be identified as resulting from the external emergency stop switch having been pressed.

In addition, because the portable operating panel needs to be operated at a location away from the control device, the cost of wires, as well as the diameters of the wires, will increase if a confirmation signal is input to the control device via a hard wire. For this reason, it is preferable that a confirmation signal be input to the portable operating panel via a hard wire, and a confirmation signal be transmitted to the control device by means of, for example, serial communication provided between the portable operating panel and the control device.

In addition, there are known devices in which an inexpensive, mobile general-purpose operating terminal (smart device), such as a smartphone, that allows a touch input is used as the portable operating panel (refer to, for example, Japanese Unexamined Patent Application, Publication No. 2016-60018).

Furthermore, Japanese Unexamined Patent Application, Publication No. 2016-60018 describes that a base member in which the smart device can be mounted is provided with an emergency stop switch.

SUMMARY OF THE INVENTION

One aspect of the present disclosure is directed to a robot control system including: a control device for controlling a robot; and a portable operating panel connected to the control device, wherein the portable operating panel and at least one other device include respective contact points connected in series, the control device includes a reception circuit that can detect an opening of at least one of the contact points, the portable operating panel includes a smart device having a sensor, the contact point included in the portable operating panel is opened and closed in conjunction with a physical movement of a switch member attached to the exterior of the smart device, the sensor can detect a physical quantity that changes in conjunction with the physical movement of the switch member, and the portable operating panel transmits, to the control device, a detection signal indicating the physical quantity detected by the sensor or information about the physical quantity.

DESCRIPTION OF EMBODIMENT(S) OF THE INVENTION

A robot control system 1 according to one embodiment of the present disclosure will now be described with reference to the drawings.

Figure 1:
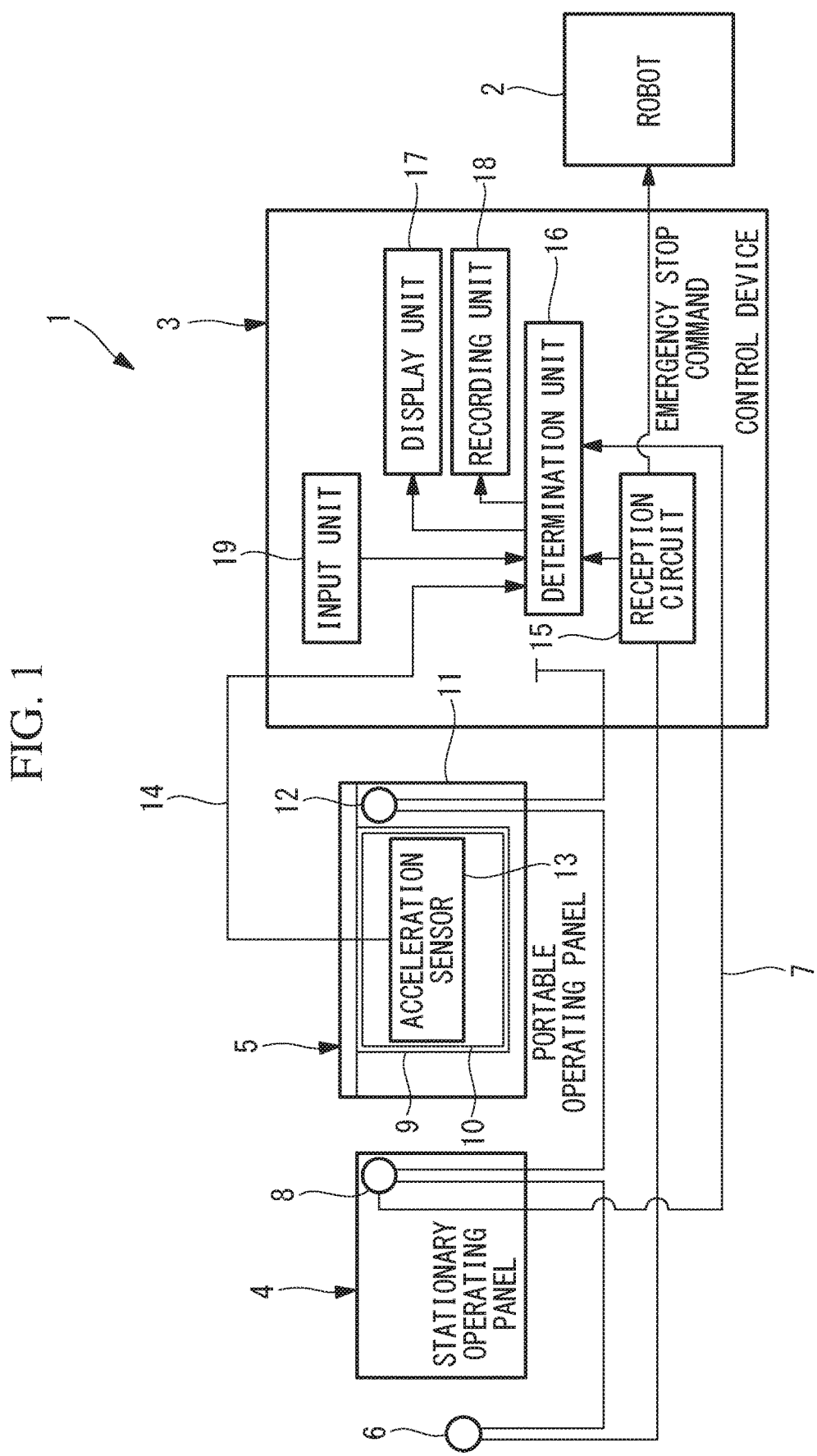
FIG. 1 is a schematic overall configuration diagram showing a robot control system according to one embodiment of the present disclosure.

As shown in FIG. 1, the robot control system 1 according to this embodiment includes a control device 3 for controlling a robot 2, a stationary operating panel 4 and a portable operating panel 5 that are connected to the control device 3, and an external emergency stop switch (contact points) 6 provided on a safety fence or the like.

The stationary operating panel 4 is connected to the control device 3 via a cable 7 and includes a first emergency stop switch (contact points) 8. The first emergency stop switch 8 includes a switch member (not shown in the figure) operated by a user and two sets of contact points (not shown in the figure) that are mutually exclusively opened and closed through the operation of the switch member. One set of the contact points are opened as a result of the switch member being pressed and are held open until the contact points are closed as a result of the switch member being reset. The other set of the contact points are opened as a result of the switch member being reset, disconnecting a circuit for outputting a confirmation signal, and are closed as a result of the switch member being pressed, outputting a confirmation signal.

The portable operating panel 5 includes: a smart device 9 having a touch panel sensor 10 used for display and input; a base member 11 that attachably/detachably accommodates the smart device 9 with the touch panel sensor 10 being exposed and that can be gripped with a single hand; an enabling switch (not shown in the figure) provided at a position on the base member 11, i.e., the position of the hand gripping the base member 11; and a second emergency stop switch (contact points) 12 provided on the base member 11.

The smart device 9 is a general-purpose device and includes, in the standard configuration, an acceleration sensor (sensor) 13, a camera (sensor, light amount sensor, not shown in the figure), and a communication means 14, besides the touch panel sensor 10.

In this embodiment, the smart device 9 constantly transmits an acceleration detection signal from the acceleration sensor 13 to the control device 3 via the communication means 14.

The second emergency stop switch 12 provided on the base member 11 includes a switch member (not shown in the figure) operated by the user and one set of contact points (not shown in the figure) that are opened and closed through the operation of the switch member. The contact points are opened as a result of the switch member being pressed and are held open until the contact points are closed as a result of the switch member being reset.

Similarly to the second emergency stop switch 12, the external emergency stop switch 6 provided on the safety fence or the like includes a switch member (not shown in the figure) operated by the user and one set of contact points (not shown in the figure) that are opened and closed through the operation of the switch member. The contact points are opened as a result of the switch member being pressed and are held open until the contact points are closed as a result of the switch member being reset.

The one set of contact points of the first emergency stop switch 8, the contact points of the second emergency stop switch 12, and the contact points of the external emergency stop switch 6 are connected in series (in cascade) between a power supply and a reception circuit 15 in the control device 3. By doing so, a supply voltage is input to the reception circuit 15 while the contact points of all the emergency stop switches 6, 8, and 12 are closed (the switch members are reset). On the other hand, when the switch members of any one of the emergency stop switches 6, 8, and 12 is pressed, the supply voltage cannot be detected in the reception circuit 15 as a result of the corresponding contact points being opened, thereby causing the control device 3 to place the robot 2 into an emergency stop state.

The control device 3 includes: a determination unit 16 that receives, via the communication means 14, a signal detected by the acceleration sensor 13, i.e., the signal being sent from the smart device 9 in the portable operating panel 5 by means of communication, and that accepts a reception signal received by the reception circuit 15; a display unit 17 for displaying the result of a determination made by the determination unit 16; a recording unit 18 for recording the determination result; and an input unit 19 for allowing a worker to optionally input, to the determination unit 16, data, etc. about the structure of each component.

The determination unit 16 is configured from a processor. When a predetermined change occurs in the detection signal of the acceleration sensor 13 at the timing when the reception signal received by the reception circuit 15 does not detect a supply voltage, the determination unit 16 determines that the robot 2 has been urgently stopped through the operation of the second emergency stop switch 12 provided on the portable operating panel 5. The display unit 17 is a monitor, and the recording unit 18 is a memory.

In this case, the predetermined change in the detection signal of the acceleration sensor 13 includes a change in acceleration equal to or larger than a predetermined threshold value, i.e., the change occurring when the switch member of the second emergency stop switch 12 provided on the base member 11 is pressed.

On the other hand, if the predetermined change is not seen in the detection signal of the acceleration sensor 13 at the timing at which the reception circuit 15 does not detect a supply voltage in the reception signal, the determination unit 16 determines that the robot 2 has been urgently stopped through the operation of the external emergency stop switch 6.

According to the robot control system 1 of this embodiment with the above-described configuration, when the contact points of at least one of the emergency stop switches 6, 8, and 12 that are provided externally, on the stationary operating panel 4, and on the portable operating panel 5, respectively, are opened while the robot 2 is operating, the reception circuit 15 detects that the contact points have been opened, thereby making it possible to quickly and urgently stop the robot 2. No matter what contact points are opened, the commonly used reception circuit 15 can urgently stop the robot 2 in the same manner because the contact points of the three emergency stop switches 6, 8, and 12 are connected in series.

In this case, when the contact points on the stationary operating panel 4 are opened, a confirmation signal resulting from the other set of contact points on the stationary operating panel 4 being closed is sent to the control device 3, and therefore, it can be easily confirmed that the first emergency stop switch 8 on the stationary operating panel 4 has been operated. On the other hand, because the portable operating panel 5 is structured merely by attaching the contact points to the exterior of the smart device 9, a confirmation signal indicating the opening of the contact points cannot be input to the smart device 9. However, as a result of the acceleration detected by the acceleration sensor 13 being changed, the detection signal of the acceleration sensor 13 that is sent to the control device 3 changes because the acceleration sensor 13 can detect a physical quantity, i.e., an acceleration, that changes in accordance with the physical movement of the switch member, said physical movement indicating that the second emergency stop switch 12 has been operated.

Figure 2:
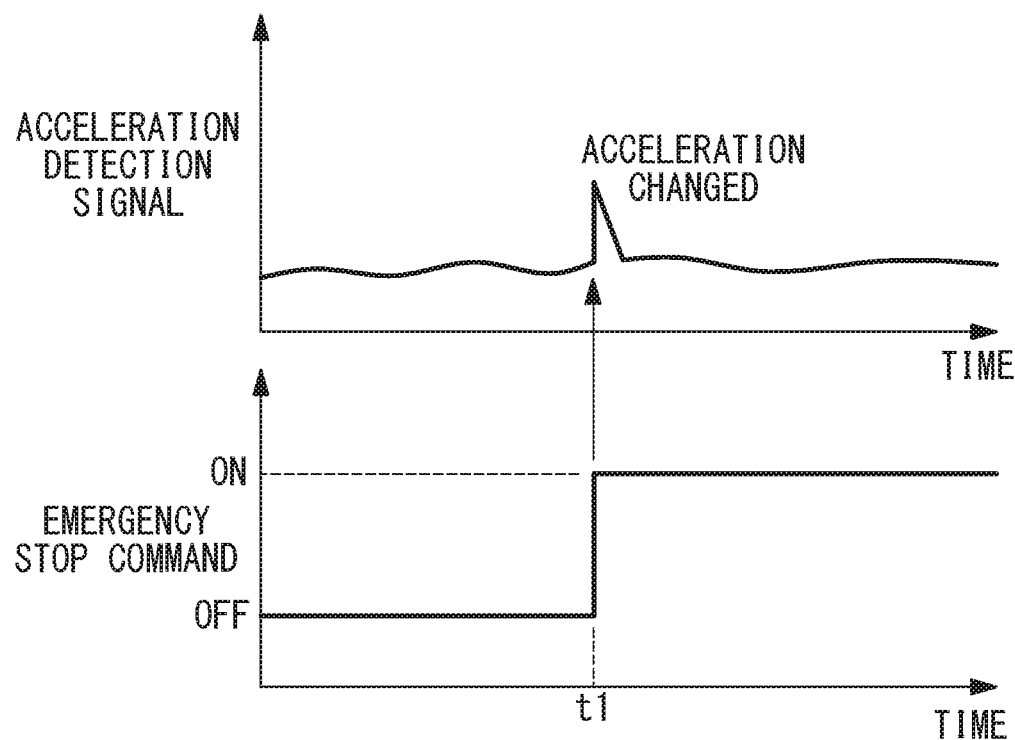
FIG. 2 is a diagram showing a case where it is determined that an emergency stop switch on a portable operating panel has been operated by comparing a detection signal of an acceleration sensor provided on the portable operating panel of the robot control system in FIG. 1 with an emergency stop command signal output from a reception circuit.

Also, when a prominent change is seen in the acceleration detection signal in the determination unit 16 of the control device 3 at the timing at which the emergency stop command signal is switched from OFF to ON, as shown in FIG. 2, on the basis of the received acceleration detection signal and the emergency stop command signal that has been input to the robot 2 and that has been received from the reception circuit 15, the determination unit 16 can determine that the second emergency stop switch 12 on the portable operating panel 5 has been operated, and information indicating that the second emergency stop switch 12 has been operated is then displayed on the display unit 17 and recorded in the recording unit 18.

Figure 3:
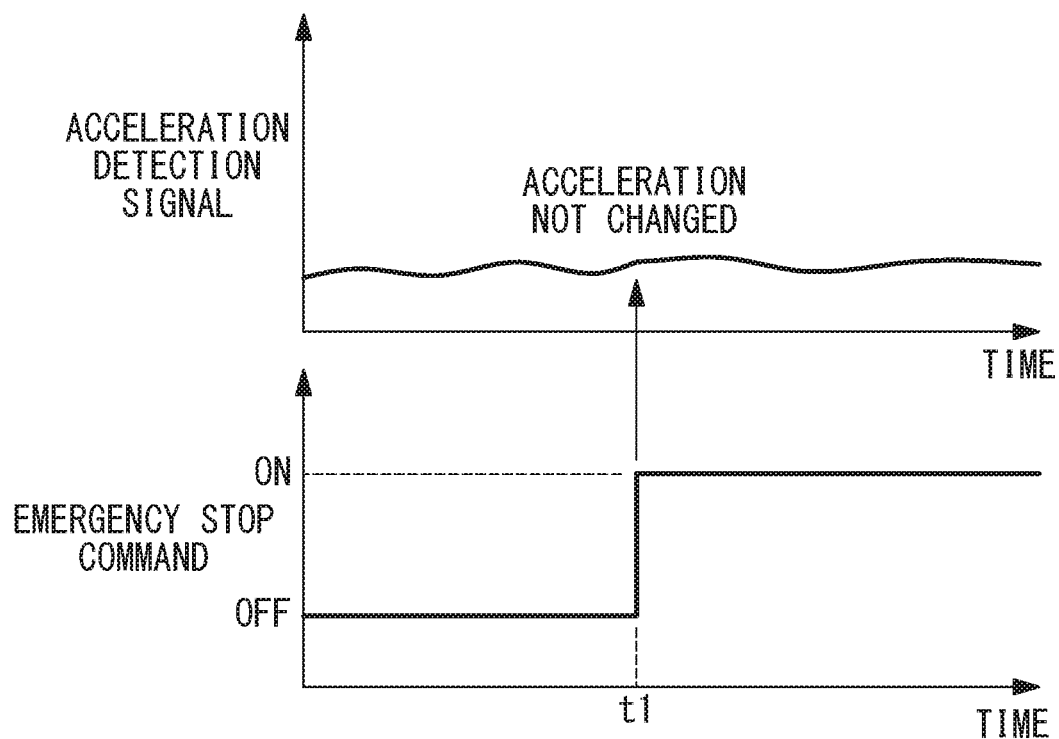
FIG. 3 is a diagram showing a case where it is determined that an emergency stop switch on a portable operating panel is not operated by comparing a detection signal of an acceleration sensor provided on the portable operating panel of the robot control system in FIG. 1 with an emergency stop command signal output from a reception circuit.

On the other hand, as shown in FIG. 3, if no prominent change is seen in the acceleration detection signal at the timing when the emergency stop command signal is switched from OFF to ON, the determination unit 16 can determine that the second emergency stop switch 12 has not been operated.

This affords an advantage in that the control device 3 can be made to conveniently identify the opening of the contact points on the portable operating panel 5, which uses the general-purpose smart device 9 not having a special input terminal. In addition, if neither a confirmation signal, which indicates the opening of the contact points of the first emergency stop switch 8, nor a change in acceleration, which indicates the opening of the contact points of the second emergency stop switch 12, is seen, the determination unit 16 can easily determine that the relevant emergency stop has been actuated through operation of the external emergency stop switch 6.

Note that although this embodiment has been described by way of an example where it is determined that the second emergency stop switch 12 on the portable operating panel 5 has been operated on the basis of a change in the acceleration that is detected by the acceleration sensor 13 provided on the general-purpose smart device 9, instead of this, the same determination may be made on the basis of an output from the touch panel sensor 10 or the camera provided on the general-purpose smart device 9 or by combining the outputs from two or more sensors, including the touch panel sensor 10 and the camera, that are provided on the general-purpose smart device 9.

For example, in the case where an output from the touch panel sensor 10 is used, the switch member of the second emergency stop switch 12 can be disposed at a position where the switch member is brought closer to or into contact with a predetermined region of the touch panel sensor 10 when the switch member is pressed.

Furthermore, for example, in the case where an output from the camera is used, the camera can be used as a light amount sensor for detecting a change in the amount of light, and the switch member on the second emergency stop switch 12 can be disposed at a position where the field of view of the camera is blocked when the switch member is pressed. In the case where a light amount sensor different from the camera is provided, the light amount sensor may be used.

Alternatively, an operation of the second emergency stop switch 12 may be detected by arranging the switch member within the field of view of the camera and monitoring a change in the position of the switch member in the image. In addition, the operation of the second emergency stop switch 12 may be detected on the basis of the degree by which the image of the camera sways.

Although this embodiment has been applied to the case where the emergency stop switches 8 and 12 are used, this embodiment may also be applied to a robot control system 1 provided with a plurality of enabling switches connected in series. In addition, in the case of the robot control system 1 provided with a plurality of enabling switches, an output from at least one of the acceleration sensor 13, the camera, and the touch panel sensor 10 may be used to identify which of the enabling switches has caused the robot 2 to urgently stop.

The accuracy of determination may be enhanced by machine-learning determination based on outputs from a sensor.

Figure 4:
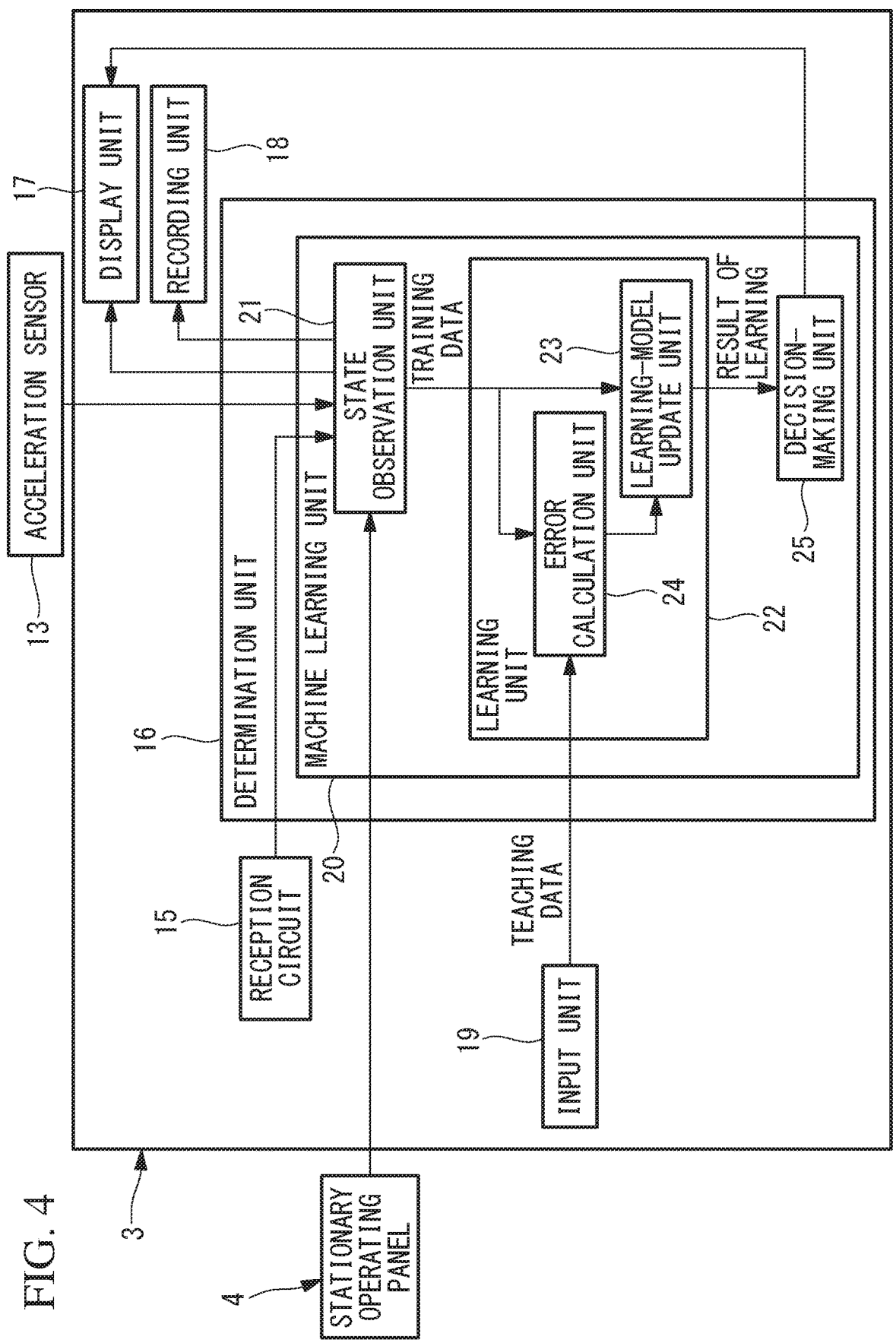
FIG. 4 is a schematic block diagram showing a control device provided in the robot control system in FIG. 1.

FIG. 4 is a block diagram of the control device 3. As shown in FIG. 4, the determination unit 16 of the control device 3 includes a machine learning unit 20 for performing machine learning.

The machine learning unit 20 has a function for extracting, by analysis, useful rules, knowledge, expressions, determination criteria, etc. from a set of input data, outputting the results of determination, and learning knowledge.

The machine learning unit 20 includes a state observation unit 21 and a learning unit 22.

In this embodiment, the machine learning unit 20 performs supervised learning. In supervised learning, teaching data, i.e., a large number of data sets composed of inputs and results (labels), is input to the machine learning unit 20. The machine learning unit 20 learns features contained in the input data sets. The machine learning unit 20 generates a model for estimating a result corresponding to an input (learning model), i.e., a model for inductively acquiring the relationship between the input and the result. Supervised learning can be realized by using an algorithm such as a neural network. The learning model corresponds to an algorithm such as a neural network. Here, the neural network will be described.

Figure 5:
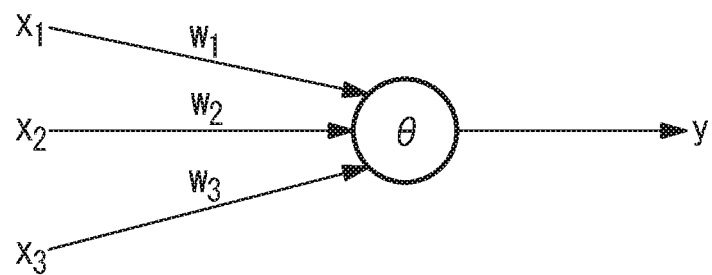
FIG. 5 is a schematic diagram showing a model of a neuron.

FIG. 5 is a schematic diagram showing a model of a neuron included in the neural network.

The neural network is configured from a computer or the like for realizing a neural network emulating the model of the neuron shown in FIG. 5.

The neuron outputs an output y in response to a plurality of inputs x (input x1 to input x3, as one example in FIG. 5). The inputs x1 to x3 are multiplied by respective weights w (w1 to w3) corresponding to these inputs x. By doing so, the neuron outputs the output y represented by Expression (1). Note that the inputs x, the output y, and the weights w are all vectors.

$$y = f_k(\Sigma_{i=1}^n x_i w_i - \theta) \qquad (1)$$

Here, $\theta$ is a bias, and $f_k$ is an activation function.

Figure 6:
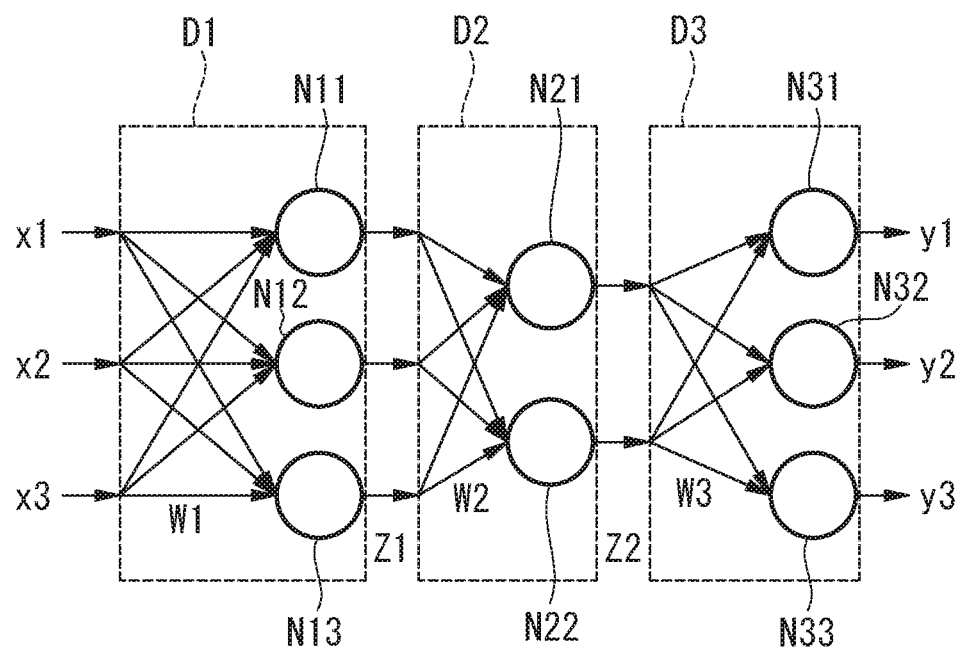
FIG. 6 is a schematic diagram of a neural network.

FIG. 6 is a schematic diagram of the neural network.

The neural network shown in FIG. 6 has three layers of weights in which a plurality of the above-described neurons are combined. FIG. 6 is a schematic diagram showing the neural network having three layers D1 to D3 of weights.

A plurality of inputs x (here, the input x1 to the input x3 as one example) are input from the left of the neural network, and results y (here, a result y1 to a result y3 as one example) are output from the right of the neural network. More specifically, the inputs x1 to x3 are multiplied by weights corresponding to three neurons N11 to N13 and are then input to the three neurons N11 to N13. The weights that multiply these inputs are denoted as w1 collectively.

The neurons N11 to N13 output z11 to z13, respectively. The outputs z11 to z13 are denoted as feature vectors z1 collectively and can be regarded as vectors resulting from extracting feature quantities of the input vectors. These feature vectors z1 are feature vectors between the weights w1 and weights w2. The outputs z11 to z13 are multiplied by weights corresponding to two neurons N21 and N22 and are then input to the two neurons N21 and N22. The weights that are multiplied by these feature vectors are denoted as w2 collectively.

The neurons N21 and N22 output z21 and z22, respectively. The outputs z21 and z22 are denoted as feature vectors z2 collectively. These feature vectors z2 are feature vectors between the weights w2 and weights w3. The outputs z21 to z22 are multiplied by weights corresponding to three neurons N31 to N33 and are then input to the three neurons N31 to N33. The weights that multiply these feature vectors are denoted as w3 collectively. Finally, the neurons N31 to N33 output the results y1 to y3, respectively.

The operation of the neural network includes a learning mode and a prediction mode. For example, in the learning mode, the weights w are learned by using training data and teaching data. In the prediction mode, results are output from the neural network using parameters, such as the weights, that have been learned.

Here, online learning, in which data obtained by actually operating the control device 3 in the prediction mode is learned promptly and is then reflected on the subsequent operation, is possible. Alternatively, batch learning, in which intensive learning is performed using pre-acquired data groups and a detection mode is performed subsequently all the time with the obtained parameters, is also possible. Alternatively, it is also possible to employ an intermediate mode between the online learning and the batch learning, in which the learning mode is interposed each time a certain amount of data has been collected.

The weights w1 to w3 may be weights that can be learned by the error backpropagation method. Information on errors flows from the right side to the left side. The error backpropagation method is a method in which the weight for each neuron is adjusted (learned) so that the difference between the output y in response to the input x and the real output y (label) is made small. For such a neural network, the number of layers can be further increased to three or more (referred to as deep learning).

In a determination as to whether or not the second emergency stop switch 12 on the portable operating panel 5 in the above-described robot control system 1 has been operated, the opening of the contact points is determined according to whether the output value (detection signal) from a sensor or a change in the output value has exceeded a determination value or whether the output value exceeds the determination value. In contrast, in the robot control system 1 using machine learning, the opening and closing of the contact points through the operation of the switch member are determined on the basis of the output values from the sensor within a certain interval of time.

Here, machine learning will be described by way of an example where it is determined by using the acceleration sensor 13 as to whether or not the second emergency stop switch 12 on the portable operating panel 5 has been operated.

The state observation unit 21 acquires an output value of the acceleration sensor 13. For example, the state observation unit 21 acquires output values from the acceleration sensor 13 at predetermined intervals of time. The state observation unit 21 calculates state variables on the basis of the output values from the acceleration sensor 13. The state variables include at least one of the output value of the acceleration sensor 13, the change rate of the output value of the acceleration sensor 13, and the variation width of the output value of the acceleration sensor 13. Here, these variables will be described with reference to FIG. 2 by way of an example of an output value of the acceleration sensor 13.

An output value of the acceleration sensor 13 is an acceleration. In the calculation of the rate of change of the output value of the sensor (this rate of change is a jerk because the output value is an acceleration), the output value at a time t1 is set as a reference value. At an arbitrary time after the time t1, an output value is acquired. The rate of change of the output value can be calculated by dividing the difference between the output value and the reference value by the time elapsed since the time t1. The variation width of the output value of the sensor is the difference between the output value at an arbitrary time after the time t1 and the reference value.

As shown in FIG. 4, the state observation unit 21 generates training data including state variables. Training data may include data about the structure of each component in addition to the above-described state variables. The data is, for example, the specifications of the smart device and the specifications of the base member. The worker can input data about the structure of each component from the input unit 19. The recording unit 18 can store data about the structure of each component. The state observation unit 21 can acquire data about the structure of each component from the recording unit 18.

The learning unit 22 acquires teaching data. The teaching data includes information about whether or not the second emergency stop switch 12 on the portable operating panel 5 has been operated. The teaching data includes results (labels) indicating whether or not the second emergency stop switch 12 on the portable operating panel 5 has been operated. The results indicating whether or not the second emergency stop switch 12 on the portable operating panel 5 has been operated can be input by the worker from, for example, the input unit 19. Teaching data includes data corresponding to the above-described training data in association with the labels. For example, the teaching data includes at least one of the output value of the acceleration sensor 13, the rate of change of the output value, and the variation width of the output value when the second emergency stop switch 12 on the portable operating panel 5 is actually operated.

Such teaching data can be generated by combining the state variables acquired in the state observation unit 21 and the labels input by the worker from the input unit 19. Alternatively, teaching data obtained through simulation or the like that is performed on a device other than the robot control system 1 may also be used.

The learning unit 22 includes: an error calculation unit 24 for calculating an error on the basis of the training data and the teaching data; and a learning-model update unit 23 for updating the learning model that determines whether or not the second emergency stop switch 12 on the portable operating panel 5 has been operated.

The learning-model update unit 23 updates the learning model on the basis of outputs from the state observation unit 21 and outputs from the error calculation unit 24.

Here, in the learning mode of the neural network, the learning-model update unit 23 updates the learning model by using the training data and the teaching data. The learning-model update unit 23 updates the learning model so that the output calculated using the learning model in response to an input approaches the label of the teaching data. Processing in the learning mode is continued, for example, until the state variable, the output of the learning model, and the loss function regarding teaching data converge to a constant value.

The machine learning unit 20 includes a decision-making unit 25 for determining whether or not the second emergency stop switch 12 on the portable operating panel 5 has been operated on the basis of the learning model updated by the learning unit 22.

The decision-making unit 25 acquires the current training data. The decision-making unit 25 acquires the learning model updated by the learning-model update unit 23. The decision-making unit 25 determines whether or not the second emergency stop switch 12 on the portable operating panel 5 has been operated on the basis of the learning model and training data. In this case, the neural network is used in the prediction mode.

When the second emergency stop switch 12 on the portable operating panel 5 is operated, the decision-making unit 25 transmits, to the display unit 17, a signal regarding the fact that the second emergency stop switch 12 on the portable operating panel 5 has been operated. The display unit 17 shows that the second emergency stop switch 12 on the portable operating panel 5 has been operated.

By causing the machine learning unit 20 to determine whether or not the second emergency stop switch 12 on the portable operating panel 5 has been operated, it can be determined whether or not the second emergency stop switch 12 on the portable operating panel 5 has been operated by taking into account the trend or the like of the output values from the sensor. This allows the robot control system 1 to make a more accurate determination as to whether or not the second emergency stop switch 12 on the portable operating panel 5 has been operated.

The output value in the case where the touch panel sensor 10 is used as the sensor is a position at which a touch operation is detected. In the calculation of a change in the output value of the sensor, the output value at the time t1 is set as a reference value. At an arbitrary time after the time t1, an output value is acquired. The change in the output value can be obtained by calculating the difference between the output value and the reference value.

The output value in the case where a light amount sensor is used as the sensor is the amount of light. In the calculation of the rate of change of the output value of the sensor, the output value at the time t1 is set as a reference value. At an arbitrary time after the time t1, an output value is acquired. The rate of change of the output value can be calculated by dividing the difference between the output value and the reference value by the time elapsed since the time t1. The variation width of the output value of the sensor is the difference between the output value at an arbitrary time after the time t1 and the reference value.

The output value in the case where a camera is used as the sensor is image data. In the calculation of a change in the output value of the sensor, the output value at the time t1 is set as a reference value. At an arbitrary time after the time t1, an output value is acquired. The change in the output value can be obtained by calculating the difference between the output value and the reference value.

Although this embodiment is applied to a case where it is determined that the contact points are opened through the operation of a switch member, this embodiment may be applied to a determination in the case where the contact points are closed through the operation of the switch member.

Although this embodiment has been described by way of an example where the stationary operating panel 4, which includes the first emergency stop switch 8, is provided in addition to the portable operating panel 5, the stationary operating panel 4 may be omitted.

Although this embodiment has been described by way of an example where the determination unit 16 is mounted in the control device 3, the determination unit 16 may be mounted in another device. For example, the determination unit 16 may be mounted in another device connected to the control device 3 via a network. Along with this, the machine learning unit 20 included in the determination unit 16 may also be mounted not in the control device 3 but in, for example, another device connected to the control device 3 via a network.

Although this embodiment has been described by way of an example where the acceleration sensor 13 for detecting acceleration is used as the sensor, this embodiment is not limited to this example. The sensor may be one for detecting a physical quantity that changes in accordance with a physical movement of the switch member. In addition, a sensor for detecting information about a physical quantity that changes in accordance with a physical movement of the switch member may also be employed.

Physical quantities that change in accordance with a physical movement of the switch member include: the distance between the switch member and a prescribed region of the smart device 9 in the case where the sensor is a touch panel sensor or a proximity sensor; the amount of light radiated on a prescribed region of the smart device 9 in the case where the sensor is a light amount sensor; and image data that can be converted into image information, such as visible light, radiated on a prescribed region of the smart device 9 in the case where the sensor is a camera.

The invention claimed is:

1. A robot control system comprising:
a control device for controlling a robot;
a reception circuit included in the control device;
a portable operating panel connected to the control device;
a general-purpose device included in the portable operating panel;
a switch attached to the exterior of the general-purpose device;
first contact points included in the portable operating panel;
second and subsequent contact points respectively included in one or more devices other than the portable operation panel; and
a sensor included in the general-purpose device,
wherein the first contact points and the second and subsequent contact points are connected in series,
wherein the reception circuit detects an opening of at least one of the first contact points and the second and subsequent contact points,
wherein the first contact points are opened and closed in conjunction with a physical movement of the switch,
wherein the sensor does not electrically detect the opening of the first contact points based on a conductive state thereof but detects changes in conjunction with the actuation of the switch in order to detect the opening of the first contact points, and
wherein the portable operating panel transmits, to the control device, a detection signal indicating the changes or information about the changes.

2. The robot control system according to claim 1, further comprising:
a processor comprising hardware, the processor being configured to:
be in communication with the control device, and
determine that the first contact points are opened based on the detection signal and the opening of the at least one of the first contact points and the second and subsequent contact points detected by the reception circuit.

3. The robot control system according to claim 1, further comprising:
a processor comprising hardware, the processor being configured to:
be in communication with the control device, and
determine that the first contact points are closed based on the detection signal and the closing of the first contact points and the second and subsequent contact points detected by the reception circuit.

4. The robot control system according to claim 1,
wherein the changes include an acceleration of the general-purpose device, and
the sensor comprises an acceleration sensor for detecting the acceleration.

5. The robot control system according to claim 1,
wherein the changes include a distance between the switch and a prescribed region of the general-purpose device, and the sensor includes a touch panel sensor or a proximity sensor for detecting that a material is in contact with or is close to the prescribed region.

6. The robot control system according to claim 1,
wherein the changes include an amount of light radiated on a prescribed region of the general-purpose device, and
the sensor comprises a light amount sensor for detecting the amount of light.

7. The robot control system according to claim 1,
wherein the changes include image data convertible into image information, comprising visible light, radiated on a prescribed region of the general-purpose device, and
the sensor comprises a camera for acquiring the image data.

8. The robot control system according to claim 2,
wherein the determining of the first contact points being opened includes performing supervised learning, and
wherein the performing of the supervised learning includes:
  observing a state variable including the detection signal of the sensor,
  acquiring teaching data including information generated when the first contact points are opened or closed due to the physical movement of the switch to update, based on the teaching data, a learning model for determining whether or not the first contact points are opened or closed due to the physical movement of the switch, and
  acquiring the detection signal to determine, based on the current detection signal and the learning model, whether or not the first contact points are opened or closed due to the physical movement of the switch.

9. The robot control system according to claim 3,
wherein the determining of the first contact points being closed includes performing supervised learning, and
wherein the performing of the supervised learning includes:
  observing a state variable including the detection signal of the sensor,
  acquiring teaching data including information generated when the first contact points are opened or closed due to the physical movement of the switch to update, based on the teaching data, a learning model for determining whether or not the first contact points are opened or closed due to the physical movement of the switch, and
  acquiring the detection signal to determine, based on the current detection signal and the learning model, whether or not the first contact points are opened or closed due to the physical movement of the switch.

10. The robot control system according to claim 2, wherein the processor is connected to the control device via a network.

11. The robot control system according to claim 3, wherein the processor is connected to the control device via a network.

12. The robot control system according to claim 1, further comprising:
a stationary operation panel connected to the control device,
wherein the stationary operation panel is provided with second contact points,
wherein the stationary operation panel comprises a detection circuit that detects an opening of the second contact points and sends the control device a confirmation signal indicating the opening detected by the detection circuit.

* * * * *